May 25, 1965  H. T. DREYER  3,185,137
VALVE MOUNTING AND SEALING STRUCTURE
Filed June 26, 1963

INVENTOR.
HERMAN T. DREYER
BY
Barnes, Kisselle, Raisch, & Choate
ATTORNEYS

United States Patent Office 3,185,137
Patented May 25, 1965

3,185,137
VALVE MOUNTING AND SEALING STRUCTURE
Herman T. Dreyer, Detroit, Mich., assignor to Continental Aviation and Engineering Corporation, Detroit, Mich., a corporation of Virginia
Filed June 26, 1963, Ser. No. 290,704
5 Claims. (Cl. 123—48)

This invention relates to improvements in pressure fluid control valves and associated mounting and conduit structures.

The present invention is particularly directed to the problem of providing a valve assembly in a two-part variable compression ratio (VCR) piston for controlling discharge of high pressure fluid from a chamber formed between the parts of the piston to thereby control movement of the parts relative to one another. The fluid flow connection to such a valve assembly must be able to handle fluid pressures in the order of 2000 p.s.i. without leakage of the pressure fluid around the valve assembly. The valve assembly must be mounted in a secure manner so as to withstand the extremely rough shocks, vibrations and reciprocating motion to which it is subjected due to it being a part of an internal combustion engine piston which reciprocates in an engine operating at various speeds up to for example 3,000 r.p.m.

In order to produce a commercially acceptable VCR piston, the valves employed therein must lend themselves to a practical inspection test procedure to insure that the operating characteristics of these valves meet design specifications. It is therefore preferred to provide a capsulated valve assembly wherein an operable valve mechanism is encased within its own housing so that it may be subjected to an operating test prior to assembly in the piston. However, valve encapsulation tends to complicate the mounting and sealing problems. If the valve casing is adapted to be screwed axially into a bore in the piston in order to tightly clamp a gasket or seal ring between the end of the casing and a fluid inlet end of the bore, the valve assembly may be warped or distorted as torque is applied thereto in tightening the casing against the gasket. Also, since the piston and valve casing differ in material and are subjected to rather severe temperature changes in normal operation, differential expansion occurs between these parts which, in the case of the aforementioned screw-type seal, causes a variation in the engagement pressure on the sealing gasket resulting in an unsatisfactory pressure fluid seal.

An object of the present invention is to provide simplified means for securely mounting a fluid flow control valve in a surrounding structure.

Another object is to provide an improved valve assembly which co-operates with a surrounding structure in a simple and economical manner to provide a reliable high pressure fluid seal which prevents fluid leakage from communicating flow passages in the valve assembly and surrounding structure to the clearance space provided for receiving the valve assembly in the structure.

A more particular object of the invention is to provide an improved structure for mechanically and hydraulically connecting a capsulated pressure regulating valve assembly in one part of a two-part internal combustion engine piston of the type adapted for varying the clearance volume of the cylinder in which the piston reciprocates.

Other objects, features and advantages of the invention will become apparent from the following description taken in conjunction with the accompanying drawing in which.

Figure 1:
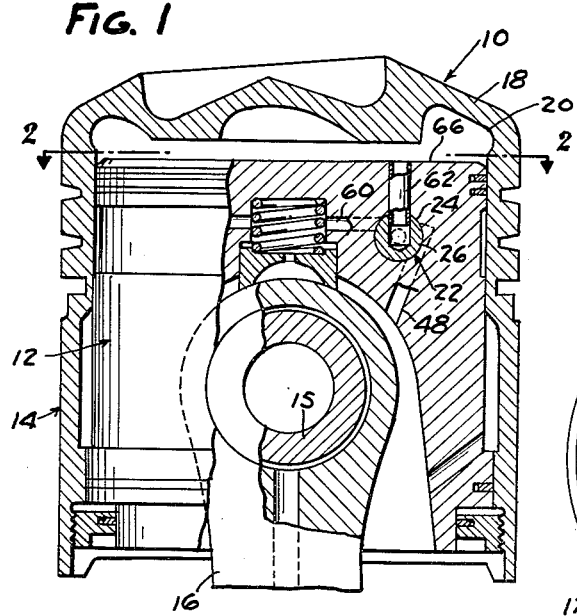
FIG. 1 is a vertical section taken through the axis of an internal combustion engine piston embodying valve structure of the present invention, portions of the piston and an associated connecting rod being shown in said elevation.
Figure 2:
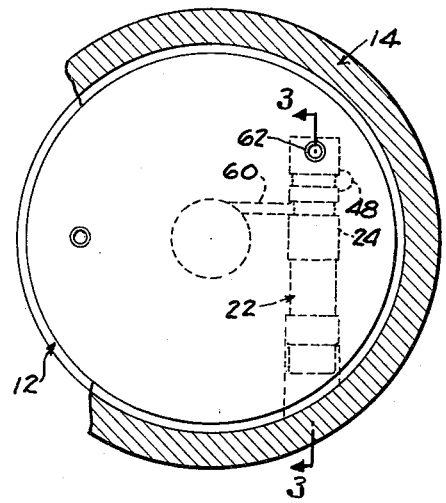
FIG. 2 is a fragmentary horizontal section taken on the line 2—2 of FIG. 1.

The piston 10 shown in FIG. 1 is a VCR (variable compression ratio) piston and comprises an inner piston 12 and an outer piston 14. Inner piston 12 is connected via a wrist pin 15 to the upper end of a connecting rod 16 in the usual manner. Outer piston 14 has a crown 18 forming the movable boundary of the combustion chamber and is movable relative to inner piston 12. A pressure fluid chamber 20 is formed in the space between crown 18 and inner piston 12 and circulation of an incompressible fluid through chamber 20 is controlled automatically by valves in such a way as to change the clearance volume of the cylinder as required to limit the maximum combustion chamber pressure to a predetermined value. The VCR piston 10 illustrated herein is similar in some respects to the various VCR pistons disclosed in U.S. Patents Numbered 2,742,027, dated April 17, 1956; 3,014,468, dated December 26, 1961; and 3,038,458, dated June 12, 1962, all issued in the name of Wilfred P. Mansfield. Reference may be made to the aforesaid patents for a disclosure of the general mode of operation as well as various uses and advantages of such pistons. Certain features found only in the particular improved VCR piston 10 illustrated herein but not the subject matter of the present invention are disclosed and claimed in co-pending patent applications of William A. Wallace and Thomas J. Pearsall, Ser. No. 290,705 filed June 26, 1963, entitled Speed Compensated Variable Compression Ratio Piston and Valve, and of William A. Wallace and Robert F. Pecha, Ser. No. 290,706 filed June 26, 1963, entitled Variable Compression Ratio Piston both assigned to the assignee herein.

Figure 3:
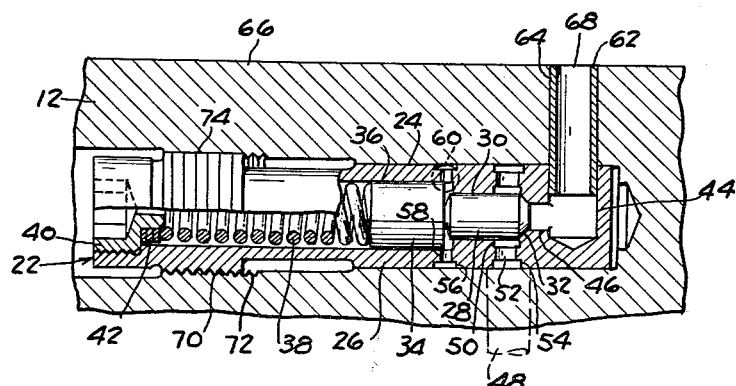
FIG. 3 is a vertical section taken on the line 3—3 of FIG. 2, portions being shown in elevation.

The preferred valve structure of the invention illustrated by way of example herein comprises a discharge valve 22 for regulating fluid pressure in chamber 20 which is disposed in a blind bore 24 provided in inner piston 12. Valve 22 includes a cylindrical casing 26 which houses all the parts of the valve mechanism proper to provide a capsulated valve which may be tested as an operable sub-assembly prior to insertion in the piston. As illustrated in FIG. 3, these parts comprise: a cylindrical valve member 28 axially slidable in a casing bore 30 and beveled at one end to seat on a chamfered valve seat 32; a cylindrical speed compensating piston 34 axially slidable in a casing bore 36 and butting at one end against member 28; a compression coil spring 38 received in bore 36 and butting at one end against piston 34 and a vented end plug 40 threaded in the other end of casing 26 and carrying shims 42 for backing up the other end of spring 38 and for adjusting valve opening pressure.

The inner end of casing 26 is provided with a cylindrical inlet passage 44 preferably comprising a radial blind bore which opens at one end to the cylindrical exterior surface of the casing. Passage 44 communicates with an axial casing passage 46 which, when valve member 28 is unseated, communicates with an outlet passage 48 in inner piston 12 via an annular chamber 50, a series of radial ports 52 and an external annular groove 54 formed in the valve casing.

Casing 26 has another annular groove 56 which communicates via a series of radial ports 58 with a chamber formed between piston 34 and the adjacent end of bore 36. Pressure fluid is admitted to this chamber from a passage 60 in inner piston 12 to insure that valve 22 provides uniform regulation of fluid pressure in chamber 20 regardless of engine speed, as more fully set forth in the aforesaid co-pending application of William A. Wallace and Thomas J. Pearsall.

In accordance with a principal feature of the present invention, fluid communication between inlet passage 44 of the valve casing and chamber 20 is provided by a tubular conduit 62. The lower end of tube 62 is received in inlet passage 44 while the remainder of the tube is disposed in a cylindrical passage 64 extending from bore 24 upwardly to the upper face 66 of inner piston 12. The tube-receiving portion of passage 44 is preferably the same diameter as piston passage 64, and both passages are preferably formed in the same operation by drilling and then reaming the passages after casing 26 has been inserted into bore 24. Tube 62 has an outside diameter which is larger than the diameter of passages 44 and 64 so as to have an interference fit therein in the order of .0005 to .0015 inch. This interference fit of tube 62 in passages 44 and 64 provides a secure retention of the tube therein which in turn insures permanent retention of valve assembly 22 in bore 24. In addition, this interference fit provides a tight, reliable mechanical seal which prevents leakage of high pressure fluid from either chamber 20 or inlet passage 44 to the space between the exterior of casing 26 and the wall of bore 24. Hence high pressure fluid cannot bypass valve member 28.

Although fluid pressures in the bore 68 of tube 62 may range up to or beyond 2000 p.s.i., the surrounding material of inner piston 12 (aluminum, for example) and of valve casing 26 (steel) serves to reinforce tube 62 against such fluid pressures. The tubing material is preferably steel to insure a tight interference joint. Preferably, passages 44 and 64 and hence tube 62 are oriented perpendicularly to the axis of casing 26 so that only a transverse or shear load is imposed on tube 62 by casing 26. In addition, the axis of casing 26 is oriented in inner piston 12 at right angles to the directions of piston reciprocation and of piston slap (parallel to the axis of wrist pin 15), which in turn considerably reduces the shear load on tube 62 since the principal inertial forces act laterally rather than axially on valve casing 26.

When valve casing 26 is adapted to have a slip fit in bore 24, the casing is provided with external threads 70 which may have a relatively large tolerance loose engagement with internal threads 72 provided in a counterbore 74 coaxial with bore 24. Threads 70, 72 merely retain valve casing 26 temporarily in proper position in bore 24 while passages 44 and 64 are drilled and reamed, and during insertion of tube 62 into the passages. Thereafter tube 62 serves as a retaining pin for the valve assembly so that casing 26 is permanently secured in the piston. The internal valve parts are then assembled through the plug end of casing 26, and are thereafter accessible for servicing by unscrewing end plug 40 from casing 26.

It is to be understood that suitable methods and means other than threads 70, 72 may be used to temporarily retain casing 26 in bore 24 during the passage forming and press fitting operations, such as shrink-fitting casing 26 in bore 24 or employing appropriate jigs and fixtures.

From the foregoing description it will now be apparent that the above-described capsulated valve and mounting structure of the invention provides a high pressure fluid conduit between chamber 20 and valve member 28 and secure retention of valve 22 in the piston. This is achieved with simple and inexpensive structure well adapted for mass production techniques. For example, standard press fit procedures may be employed to insert tube 62 into assembled relation with inner piston 12 and valve 22 in one quick operation. The assembler may be instructed to press tube 62 into part 12 until the upper end of the tube is flush with surface 66, using a predetermined minimum force calculated to be that required to produce the desired force fit for the particular size and material of tube 62. Hence by gauging the minimum force required in the press fit operation a quality control check may be maintained to insure that the specified interference tolerances are being met.

Since no seal is required between valve casing 26 and the blind end of bore 24, a relatively large clearance tolerance between these parts is permissible which in turn reduces manufacturing costs. The problem of valve distortion during assembly is substantially eliminated since it is not necessary to screw valve 22 tightly into bore 24 in order to obtain a high pressure fluid seal. The problem of differential expansion is substantially reduced since this effect is confined to the relatively small diameter tube 62 (about ¼", for example) and surrounding material of inner piston 12, as compared to the much greater distance (about 2 inches) between the threads 72 and the blind end of bore 24 in which differential expansion occurs and results in a faulty seal in the case of the aforementioned screw-type mounting and end-gasket seal.

I claim:

1. In an internal combustion engine piston having first and second coaxial parts movable axially relative to one another in the direction of reciprocation of the piston and having a pressure fluid chamber between said parts which varies in internal volume as a result of said relative movement, that improvement which comprises one of said parts having a first passage therein adapted to communicate with the chamber and a bore extending into said one part from an exterior surface thereof and intersecting said first passage, a valve casing fitted in said bore and having a passage therein registering with said first passage, a tubular member having one portion thereof secured in said first passage and another portion thereof secured in said casing passage for anchoring said valve casing in said bore and for sealing fluid tight the space between said member and said passages, said tubular member having an interior passage adapted for conducting fluid between the chamber and said valve casing passage, and means including a valve mechanism operably disposed within said valve casing for controlling fluid flow in said casing and tubular member passages.

2. The combination set forth in claim 1 wherein said tubular member has an interference press fit in said first and casing passages to thereby secure said casing in said one part and to provide said fluid tight seal.

3. The combination set forth in claim 2 wherein said one part has means for mounting a wrist pin therein perpendicular to the axis of said one part, and wherein said axes of said bore and casing are oriented substantially perpendicular to the axes of said wrist pin mounting means and one part and said tubular member extends transversely to said bore and casing axes.

4. The combination set forth in claim 2 wherein said casing has a slip fit in said bore and said casing and said one part have cooperating relatively loosely interengaged threads for temporarily retaining said casing in said bore prior to press fitting said tubular member in said passages.

5. The combination set forth in claim 4 wherein said bore has a blind end interiorly of said one part, said casing having one end disposed adjacent to but spaced from said blind end of said bore, said threads being disposed adjacent the opposite end of said casing, said tubular member and casing passage being disposed near said one end of said casing.

References Cited by the Examiner

UNITED STATES PATENTS

| 2,742,027 | 5/56 | Mansfield | 123—78 |
| 2,970,609 | 2/61 | Bermand | 137—540 |
| 3,014,468 | 12/61 | Mansfield | 123—48 |
| 3,038,458 | 6/62 | Mansfield | 123—78 |

FRED E. ENGELTHALER, *Primary Examiner.*